United States Patent [19]

Pinard et al.

[11] Patent Number: 5,533,110
[45] Date of Patent: Jul. 2, 1996

[54] HUMAN MACHINE INTERFACE FOR TELEPHONE FEATURE INVOCATION

[75] Inventors: Deborah L. Pinard; Eliana M. O. Peres; Ronald A. Evans, all of Kanata, Canada

[73] Assignee: Mitel Corporation, Canada

[21] Appl. No.: 346,600

[22] Filed: Nov. 29, 1994

[51] Int. Cl.⁶ .................................... H04M 3/42
[52] U.S. Cl. .................. 379/201; 379/202; 379/96; 379/112; 379/393
[58] Field of Search ................ 379/201, 202, 379/204, 203, 205, 112, 96, 393; 370/62, 110.1

[56] References Cited

U.S. PATENT DOCUMENTS

5,195,086  3/1993  Baumgartner et al. ............... 370/62
5,406,307  4/1995  Hirayama et al. .................... 345/120

Primary Examiner—Jeffery Hofsass
Assistant Examiner—Scott Wolinsky
Attorney, Agent, or Firm—Charles E. Wands

[57] ABSTRACT

A method of providing a visual indication to a first communication connection (CC) subscriber of the status of a telephone CC comprising the steps of providing ah icon on a display that represents the first CC subscriber, providing a call setup icon on a display representing a command to set up a CC, dragging the icon representing the first CC subscriber to the call setup icon, automatically displaying a directory of subscribers, dragging an identity of a second CC subscriber from the directory to the call setup icon, establishing a CC between communication apparatus used by the first subscriber and communication apparatus used by the second CC subscriber via subscriber's lines, changing the identity of the calls setup icon to a call icon, displaying an icon representing the second CC subscriber in the call icon, and displaying a new call setup icon, whereby icons representing CC subscribers of a call in progress are both represented and are visually discernible by the first CC subscriber in the call icon.

19 Claims, 8 Drawing Sheets

HUMAN MACHINE INTERFACE FOR TELEPHONE FEATURE INVOCATION

FIELD OF THE INVENTION

This invention relates to the field of telephony, and in particular to a method of indicating the status of various calls, to a user.

BACKGROUND TO THE INVENTION

Feature telephone sets (sets which can provide a display of status of calls and special functions associated with a call, such as a hold status) can provide only limited indication to a user as to the status of calls. For example, a set used in a key telephone system may have several lines that it may use. When one of the lines is busy, a light located adjacent a push button associated with the line lights up. However there is no indication that a call is actually in progress or who are the parties to the call, but merely that a line is in use.

If a caller has placed a call on one line on hold, and has made one or more other calls on other lines which have also been placed on hold, lights associated with each of the lines may flash as a reminder that a line is on hold. However there is no indication which subscriber is on hold on any particular line. It is often difficult to remember which call on hold belongs to which party. In such cases the user may retrieve a call from hold and address the party by the wrong name, thinking that it is a party relating to another call on hold.

When a conference call is to be made and several conferees are placed on hold, and the local user wishes to have a private conversation with one or more of the conferees but to exclude others, mistakes can be made when taking subscribers off hold and into the private conversation with sometimes embarrasing or costly results if the local user is unaware that an undesired other party can hear the private conversation.

The above problem results because it is often difficult to remember which conferee is associated with a particular line. When a conferee is to be dropped from conference call, it is easy to make a mistake and to drop the wrong conferee line from the conference.

Special feature telephones and certain PBXs and key telephone systems can provide means that attempt to help the user that has callers are on hold somewhat by reminding the user that calls are on hold, by ringing the user's telephone after a certain time period following an incoming call being placed on hold. However this does not solve the problem of the user not knowing which party is on which held line, and therefore which line should be dropped from a conference or retreived from hold.

SUMMARY OF THE INVENTION

The present invention is a method of providing information to a user unambiguously as to which persons are parties to a call. It also provides a method for calls to be made between parties, to be placed on hold, to be dropped from hold, to be conferenced or to be dropped from a conference with clear indication to the user which of the parties to any call are being dealt with. In addition, no special feature telephone is required; the invention can be implemented with any ordinary telephone set.

The invention is preferably implemented by, but is not restricted to, a telephony server to which the user's telephone is connected. The server is connected to a local area network (LAN), to which a personal computer used by the user during the progress of a call is connected. U.S. patent applications describing such systems, entitled LOCAL AREA COMMUNICATIONS SERVER SYSTEM, filed on October, 1994, invented by Deborah Pinard, Harold Sit and Tony Niro, and entitled ADAPTIVE COMMUNICATION SYSTEM, filed on Jun. 10th, 1994, invented by Deborah Pinard, Thomas Gray and Eliana Peres and assigned to Mitel Corporation are incorporated herein by reference.

The personal computer in conjunction with the server provides to the user a human machine interface (HMI) displayed on the display of the computer. Any commercial telephony software application program (application) to provide the telephony service by the server may be used. The server can be provided with a line circuit with a DTMF generator that can dial numbers and respond to incoming telephone calls under control of the application, whereupon a telephone connection is made between the local and a distant telephone via the server, a PABX and/or a central switching office. Computers which contain such application, a DTMF generator etc. and a telephone set were sold during the early 1980's under the trade mark Kontac by Mitel Corporation.

In addition modems that could dial and answer calls under control of a controlling programs and thus provide the aforenoted facility were sold by Hayes Corporation. Many compatible modems exist, such as those sold by Dell Computer Corporation and others.

Application programs that could drive the modems to dial and answer calls and which can be used with telephone equipment such as handsets have been known for a long time, such as Microsoft Works (under DOS and Windows), Delrina Winfax Pro, and others.

Due to the large proliferation of hardware and software to dial up and answer calls to other parties, it is considered to be needlessly burdening and redundant to provide a detailed description thereof, and they are believed to be known to persons skilled in the art.

In addition the ability to dial out and make and receive calls via a LAN is described in the aforenoted two patent applications, and reference is directed to the detail in those patent applications. Once the present invention is understood, it will be also understood that it is not restricted for use with those systems, but can be used with any system in which a telephony application on a personal computer or personal computer in conjunction with a server operates.

In accordance with an embodiment of the present invention, icons representing a subscriber's line associated with a local subscriber, the status of the line and associated with particular other subscribers to which calls are made or received are displayed in a manner that provides full information as to their status and the status of any call in progress, whether on line or being held, and whether it is a conference call or not. The state of the call can be changed merely by dragging icons to particular locations on the display. This provides for the first time an indication to the user which is unambiguous, and allows changing of the status of lines associated with parties to the call with certainty.

In accordance with an embodiment of the invention, a method of providing a visual indication to a first communication connection (CC) subscriber of the status of a CC is comprised of providing an icon on a display that represents the first CC subscriber, providing a call setup icon on a display representing a command to set up a CC, dragging the icon representing the first CC subscriber to the call setup icon, displaying a directory of subscribers, dragging an identity of a second CC subscriber from the directory to the call setup icon, establishing a CC between communication apparatus used by the first subscriber and communication apparatus used by the second CC subscriber via subscriber's lines, changing the identity of the calls setup icon to a call icon, displaying an icon representing the second CC subscriber in the call icon, and displaying a new call setup icon, whereby icons representing CC subscribers of a call in progress are both represented and are visually discernible by the first CC subscriber in the call icon.

In accordance with another embodiment, a method of providing a visual indication of the status of a communication connection is comprised of displaying parties to a call in progress as icons contained within the periphery of another icon representing a call in progress.

The ability to display icons on a computer display and to invoke commands by dragging an icon to another has long been known. For example, the icon of a file could be dragged to an icon of a wastebasket to delete the file on the Xerox Star computer, in the early 1980s. The same idea is used on the Apple Macintosh computer. Both computers provided the ability to store files in subdirectories, shown as file folders, by dragging the icon of a file to an icon of a file folder. Software for creating icons and the resulting commands to provide a human-machine interface (HMI) is sold commercially by Microsoft Corp. under the name Visual Basic, and by Park Place Software Corp. under the name Smalltalk. It is therefore assumed that a designer skilled in the art can create icons and cause commands to be sent to an underlying application program by dragging an icon having one meaning to an icon having another, and that a teaching of how to do this and send commands to the application software driving a modem or to an agent controlling the set-up, take down or modification of a call e.g. establish or take down a conference call, place a call on hold, etc., would be within the expected skill of a person skilled in the art.

However even with those tools available, it has not previsouly been possible to display to telephony users in an unambiguous and easy to visualize way, the parties to and status of a call, calls on hold, conference calls, etc.

BRIEF INTRODUCTION TO THE DRAWINGS

A better understanding of the invention will be obtained by reading the description of the invention below, with reference to the following drawings, in which.

DETAILED DESCRIPTION OF THE INVENTION

Figure 1:
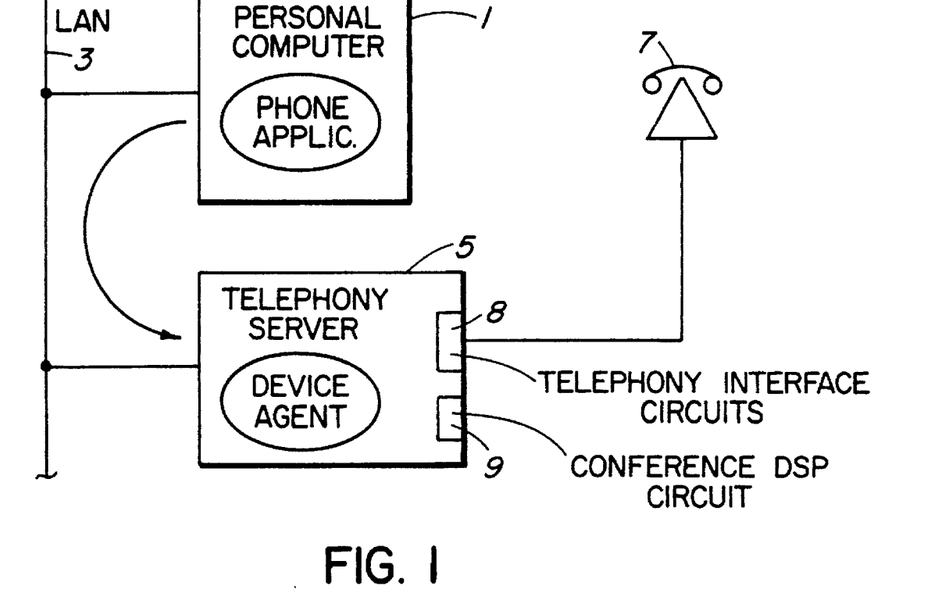
FIG. 1 is a block diagram of a system on which the invention may be operated.

FIG. 1 illustrates in block diagram a system on which the present invention can be operated. A personal computer 1 is connected to a local area network (LAN) 3, to which a telephony server 5 is also connected. A telephone set 7, to be used by the user of the personal computer 1 is connected to the telephony server 5 via a telephony interface circuit 8.

The server contains telephone interface circuits 8, conference digital signal processing circuits 9, dialing circuits, trunk circuits, etc., as described in the aforenoted patent applications assigned to Mitel Corporation. The server also contains agents such as device agent 10 and other elements as described in the aforenoted patent applications, in order to process calls.

The personal computer contains a telephone application software program which controls the telephone set 7 via device agents in the server, communicating via the LAN. The application software program can be for example the communications accessory in the Windows 3.1 program sold by Microsoft Corporation or the dialing module in the Winfax Pro program sold by Delrina Corporation. The icons can be created using the aforenoted HMI creation software programs.

Figure 2:
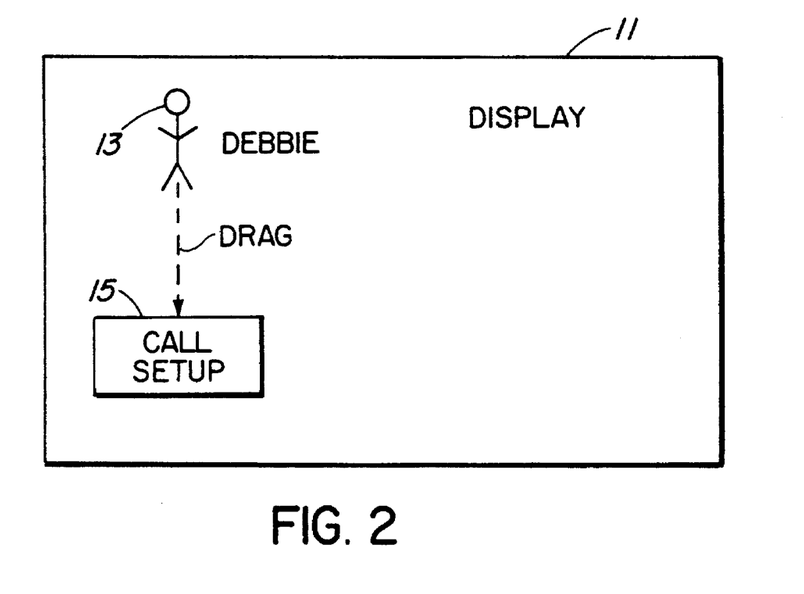
FIGS. 2–16 are diagrams of a display on a personal computer illustrating steps in the method of the invention.

Turning now to FIG. 2, a display 11 of the personal computer 1 is illustrated. An icon 13 representing a local user of telephone set 7 is created by the application software, is displayed with the name of the user, shown as Debbie. The icon could be, as shown, a stick figure, a business card, a miniature image of the face of the user, or any design which will clearly designate the local user.

The application software also provides a call setup icon 15. The meaning of the icon 15 is the establishing of a call In the first step of the method, as the user drags her icon (e.g. by using a cursor moved and invoked by mouse, not shown) to the call setup icon 15. This tells the application software that an outgoing call is to be made.

Figure 3:
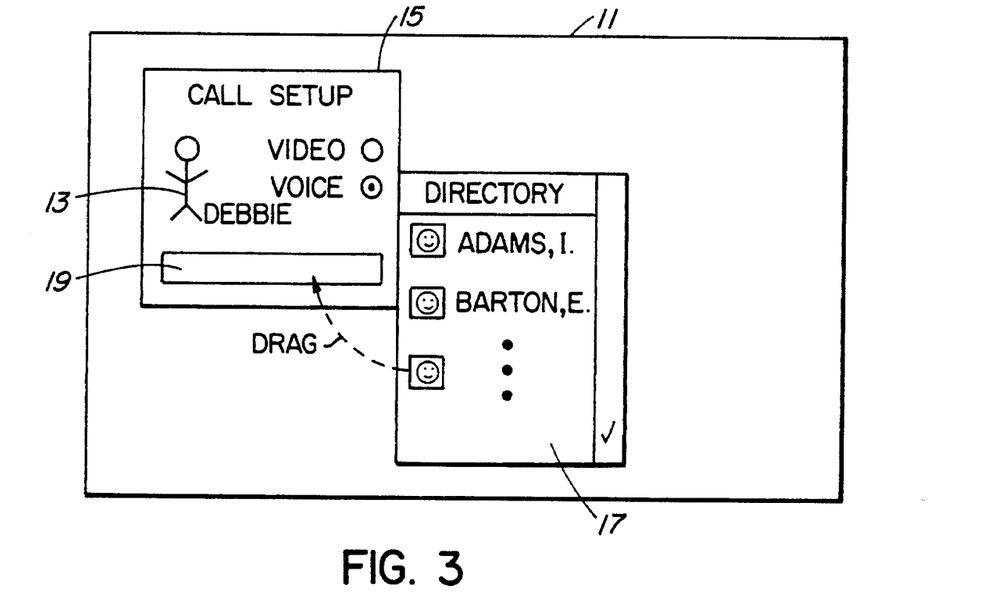

As a result, as shown in FIG. 3 the application software displays a subscriber directory 17 on the display 11, which had been stored in a memory of the personal computer if it is a personal directory that is the default directory, or which had been stored in a memory of the server if that is the default directory. The directory can be formed of alphanumeric characters, designating the names of persons listed in the directory (as shown), or the names and telephone numbers, or images of the faces of the persons listed in the directory, or combinations of the above.

The call setup icon could also have "radio buttons" or the equivalent displayed which allow the user to designate whether the call is a voice only call or a videotelephone call, which will indicate to the application software the required channel bandwidth for the call, and the peripheral hardware required, e.g. a video interface to a local camera.

The user can then drag the icon or the name of the person to be called into the call setup icon, or type the name or number of the person to be called into a dialog box 19 in the call setup icon 15, and envokes the command by keying the return key on the personal computer keyboard.

The application software program then creates an icon 21 representing the party to be called (i.e. John) and places it with his name in the call setup icon. It looks up the directory number of John from directory (if it had not been typed in by the local subscriber), and causes the server to dial John's telephone number. As soon as John answers the call, the application software program changes the call setup icon to a call icon designated as 23, and establishes a new call setup icon 24 spaced from the icon 23.

It is important that the icon 23 should have a defined boundary in order to provide the user with an indication that a call is in progress between the parties represented by the icons 13 and 21. For example, the call icon 23 can be a black or colored oval over a transparent background. Rather than the stick men shown, drawn pictures of a female and a male figure could be displayed. Drawn or scanned images of the faces of the parties to the call could be shown.

When the call is terminated, the user Debbie merely hangs up. The application software program senses this and deletes the John icon 21 from the call icon 23, deletes the call icon and allows the Debbie icon 13 to remain shown on the display. For the purposes of good housekeeping, both the Debbie icon 13 and the call setup icon 24 can be moved to an unobtrusive place on the display, such as shown in FIG. 2.

In case the local user wishes to forcibly terminate the call, she can drag the John icon to an icon of a trash basket 26, which will be sensed by the application software program as a command to terminate the call in progress.

Figure 4:
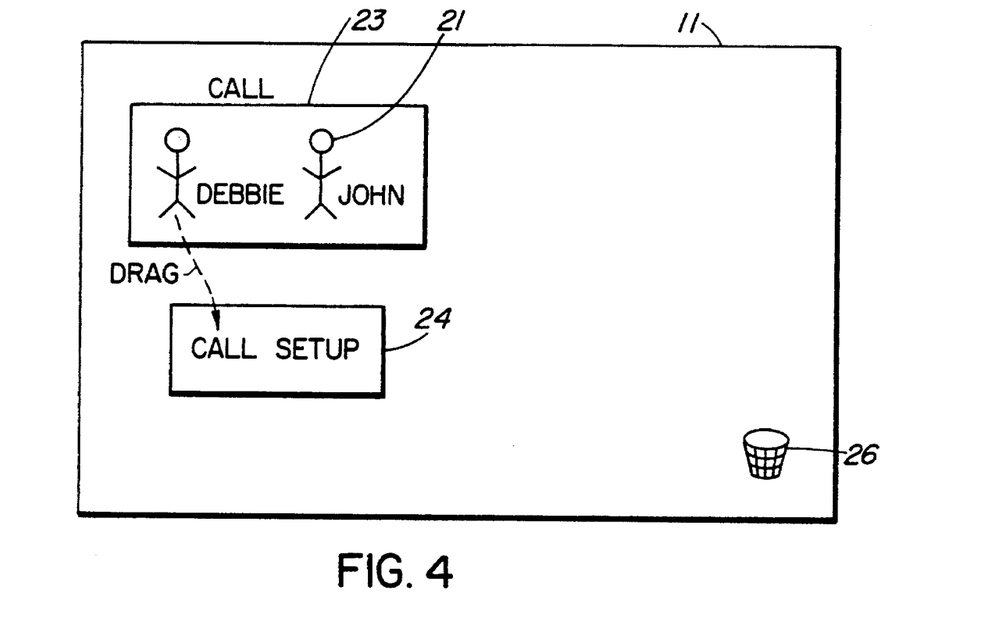
Figure 5:
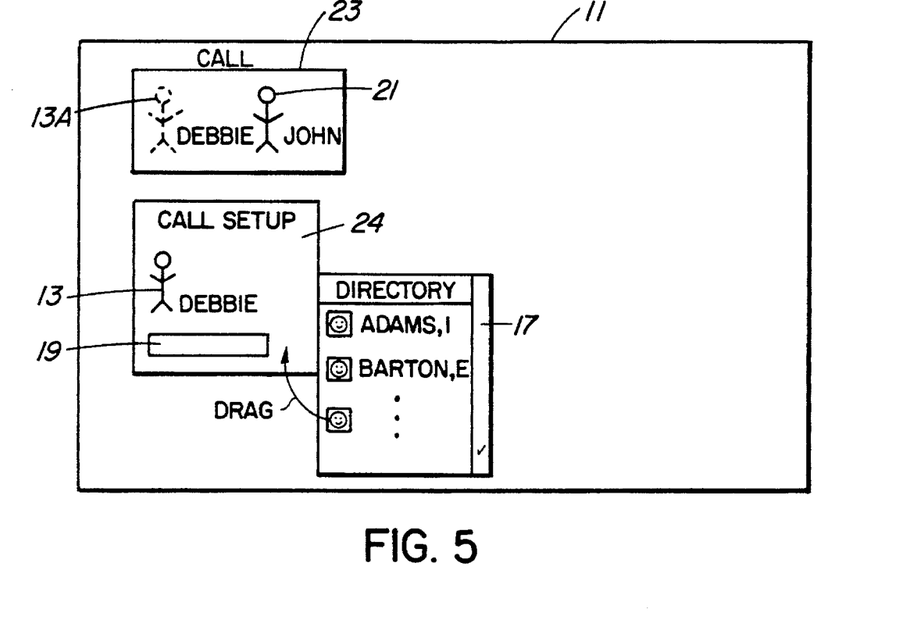

Assume now that another party is to be added to the call in order to conference that party with Debbie and John. In this case the Debbie icon 13 should be dragged to the call setup icon 24, as shown in FIG. 4. Now the application software program, sensing this occurence while a call is in progress, places the line connected to the user John on hold (retaining the icon in the call icon), and changes the Debbie icon in the call icon 23 into ghost form, 13A, as shown in FIG. 5. It provides both dial tone to the user Debbie and displays a directory 17 and dialog box 19 in the call setup box.

Figure 6:
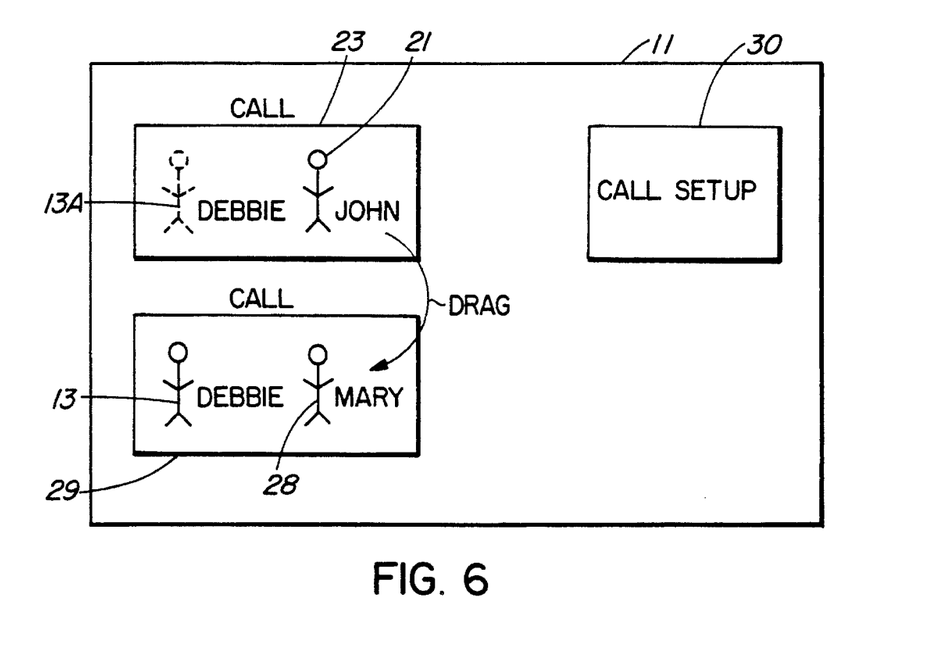

In a similar manner as described above, a directory number is selected or keyed into the dialog box, and the server establishes a call to a third party (e.g. Mary). It places a Mary icon 28 into the call setup icon and changes the call setup icon to a call icon 29 when the connection between Debbie and Mary has been established, again establishing a new call setup icon 30, as shown in FIG. 6.

Now what the local user Debbie sees on the screen is a call in progress between her and Mary, by noting the Debbie and Mary icons 13 and 29 in the call icon 29. She also sees a ghost 13A of her icon (indicating inactive) in the same call icon as John 23, which indicates that John's line is on hold. If desired, the John icon can be made to flash or change colors at some frequency (which could increase, if desired, with increase in time).

Now there are clearly two calls in progress, with the parties and the states of the calls clearly indicated with no ambiguity to Debbie on the display of her personal computer, in contrast to prior art feature phones, telephones with displays and other HMIs.

Figure 7:
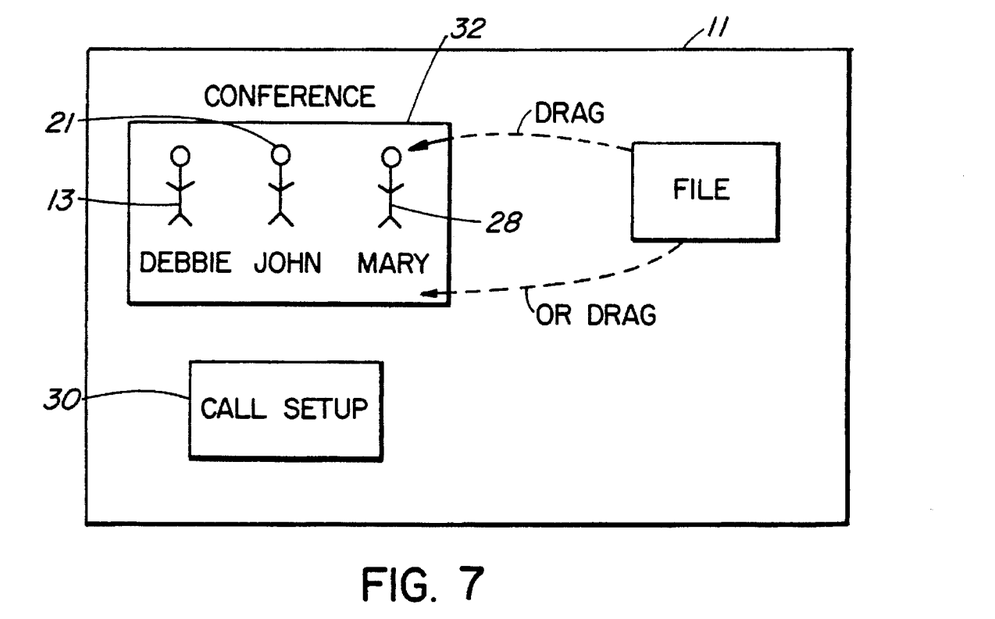

Now to conference all parties, the user Debbie merely drags the John icon to the call icon 29. As a result the call icon 23 is made to disappear by the application software program, resulting in the three icons representing the three subscribers that are party to the conference in the icon 29. The application software program changes the call icon 29 to a conference icon 32, as shown in FIG. 7. The application software program conferences John's line in with those of Debbie and Mary.

Alternatively, with reference to FIG. 6, the user Debbie could drag her icon back to the call icon 23. Her icon in the call icon 29 should be changed to a ghost and Mary's line placed on hold. The ghost Debbie icon 13A in icon 23 should be changed to a real icon 13, and the communication connection with John's line reestablished.

In this manner, the user Debbie can drag her icon between call icons 23 and 29, speaking to each of John and Mary in privacy while the other party is placed on hold. The actual talking path connection is represented by the call icon in which her icon is real, and the call in which the other party is placed on hold represents the user Debbie with a ghost icon. Thus Debbie can easily conference the parties or speak with either in privacy, with no ambiguity which parties are in the conference, which are on hold and which party is speaking to which.

Figure 7A:
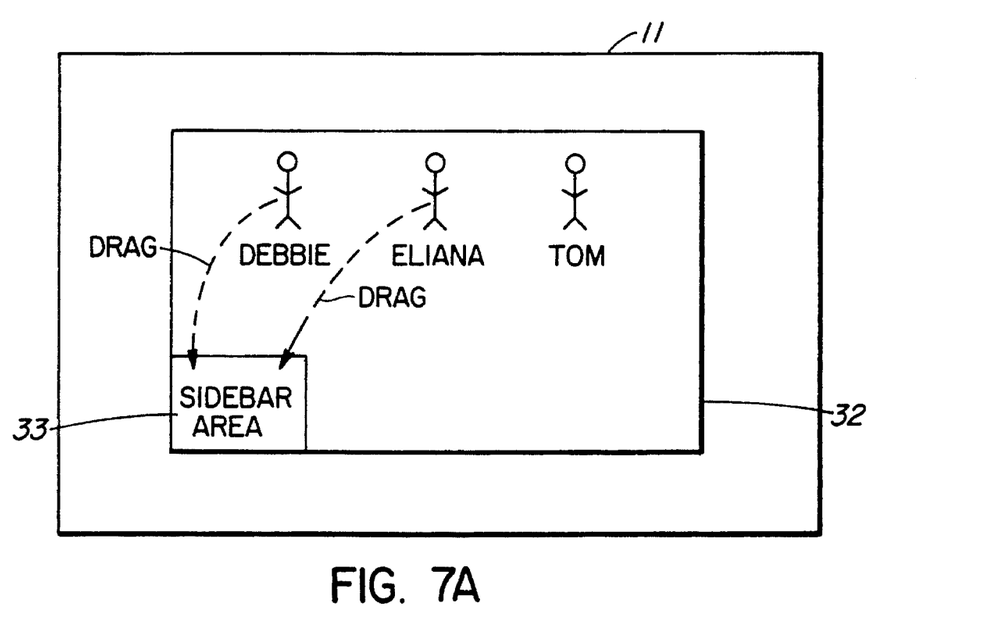

As shown in FIG. 7A, a sidebar area 33 of the conference icon can be used as a separate conference region. The user Debbie can drag any of the icons representing the conferees in to the sidebar area, and the application software program is thus instructed to establish a private connection between the parties (e.g. Debbie and Mary as shown), leaving the remaining party John on hold. Debbie can now drag any of the icons between the sidebar area and the main part of the conference icon, placing any of the parties into a private conversation or into a conference, with the remaining parties on hold.

Assume now that during a conference (or call between two parties) an incoming call arrives. The application software program causes a call waiting icon 34 with the icon 35 and name (Jim) of the calling party displayed in icon 35, as shown in FIG. 7.

Figure 8:
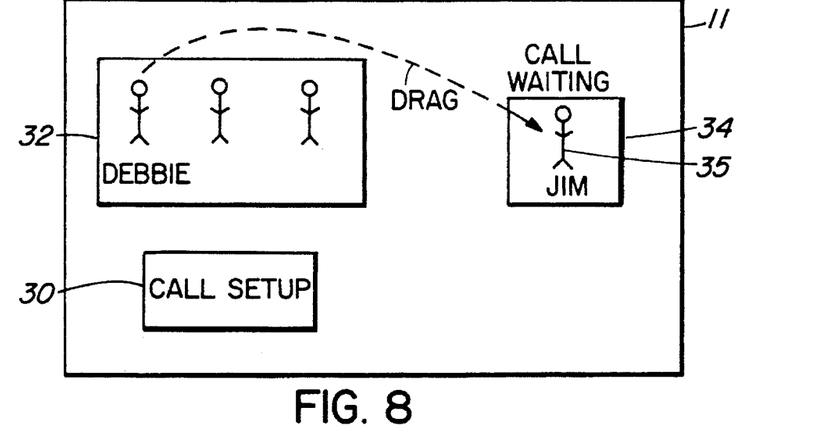
Figure 9:
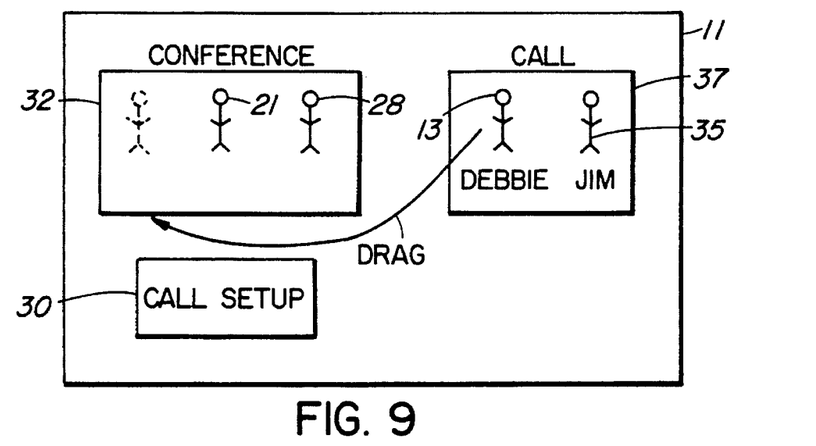

Now the user Debbie can drag her icon 13 into the call waiting icon 34, as shown in FIG. 8. The result is shown in FIG. 9. The application software program connects Debbie's line with Jim's line, allowing her to answer the incoming call, and breaking Debbie's line from the conference. Debbie's icon is changed to a ghost icon 13A in conference icon 32, and the call waiting icon 34 is changed to a call icon 37. The facts that John and Mary still are talking via the conference connection and that Debbie and Jim are talking via a call connection are clearly and unambiguously displayed on the display 11.

Figure 10:
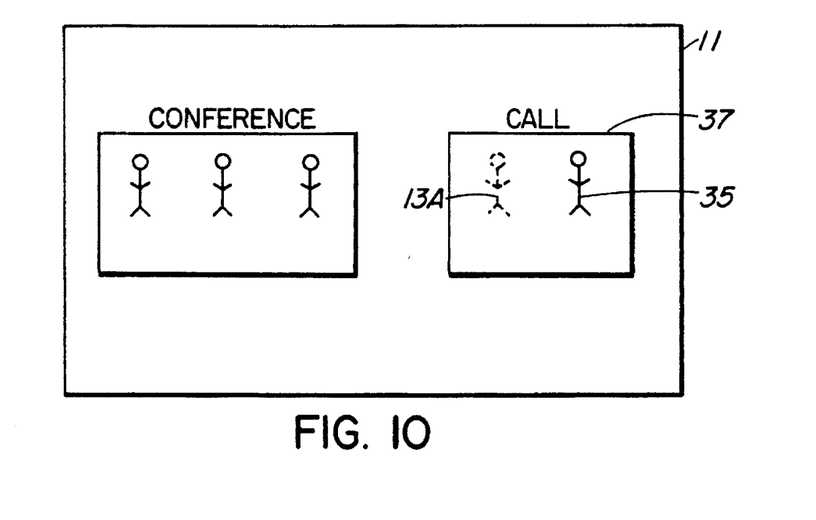

Assuming that the call between Debbie and Jim has been completed, the user Debbie then drags her icon from call icon 37 to conference icon 32., as shown in FIG. 9. The result is shown in FIG. 10, with Debbie's icon now appearing in real form in the conference icon 32. The application software program as a result of the drag reconnects her to the conference.

Figure 11:
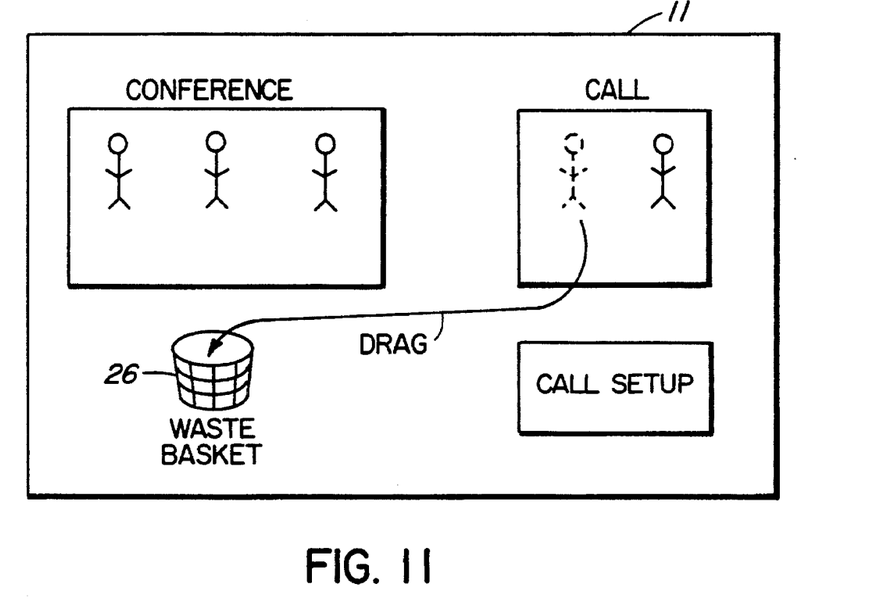

The Jim icon remains in the call icon 37, and the Debbie icon is shown in ghost 13A in call icon 37. To terminate the call to Jim, Debbie drags his icon from call icon 37 to the waste basket icon 26, as shown in FIG. 11. Indeed, any of the icons in the conference icon 32 can be dragged to the waste basket 26 to terminate the party associated with the dragged icon from the conference.

Figure 12:
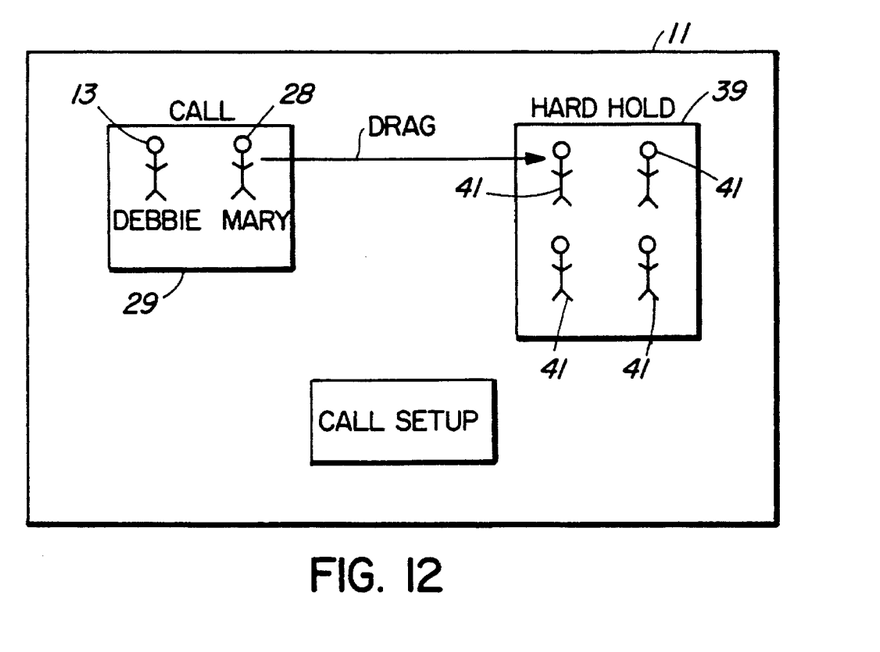

The application software program can produce a hard hold icon 39, as shown in FIG. 12. The parties Debbie (icon 13) and Mary (icon 28) are shown in call icon 29, indicating a call in progress between these parties.

To place Mary on hard hold, Debbie drags Mary's icon 28 to the hard hold icon 39. It may be seen that several other icons are contained in the hard hold icon 39, indicating that several callers have been placed on hold. Each icon, being accompanied by the name of a person and/or an easily recognized representation thereof, is clearly recognizeable by the user Debbie. The icons 41 are thus identified by person designation to the user Debbie, and she is not given an indication of what lines they are on (the coupling of the two being handled by the application software program. This is in contrast to the prior art feature phone indications which provides a flashing light, or the equivalent, to indicate that a particular line is on hold.

Debbie can easily drag any of the icons into the call icon 29 to take the associated line off hold and speak to the person represented by the icon. Due to the clear status and party representations, this can be done without ambiguity, in contrast to the prior art.

After a programmable time period, any of the icons in the hard hold can be caused to flash and/or change color at an even rate or at a rate dependent on time the associated line has been held, by the application software program.

Figure 13:
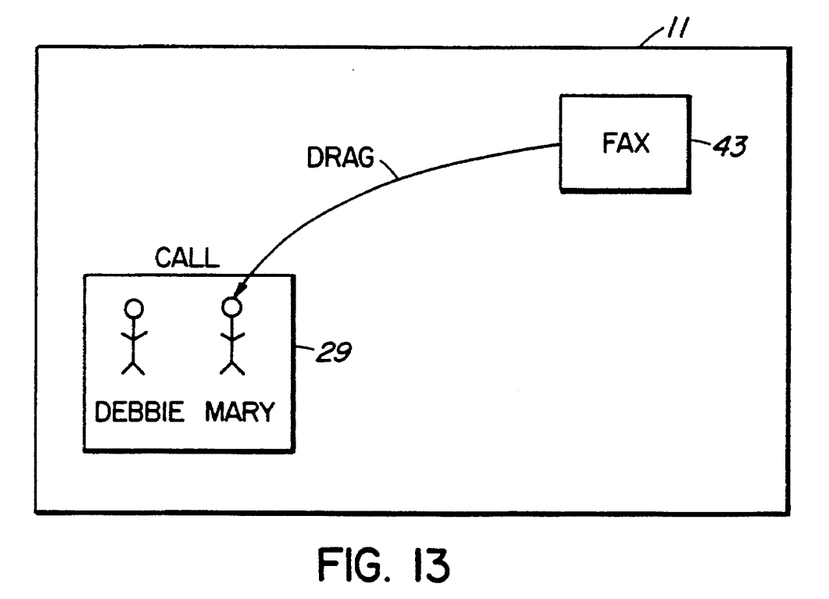

If a call is in progress and the user Debbie wishes to send a file, which may be a fax file, a data file which may be a graphic, to Mary, the icon 43 for the file is displayed on the display 11. If it is to be sent only to one party to the call, e.g. Mary, it is dragged over the Mary icon 28, as shown in FIG.

13. If it is to be sent to all of the parties to a conference call, the file icon 43 is simply brought into the call icon 29. The application software program then causes the file to be transmitted to all parties. The file itself can be displayed on a window of the display 11, if desired by Debbie (or any receiving party), in a manner similar to the retrieval of data files from any file supplier, such as Compuserve, Dialog Information Services, Internet nodes, etc.

Figure 14:
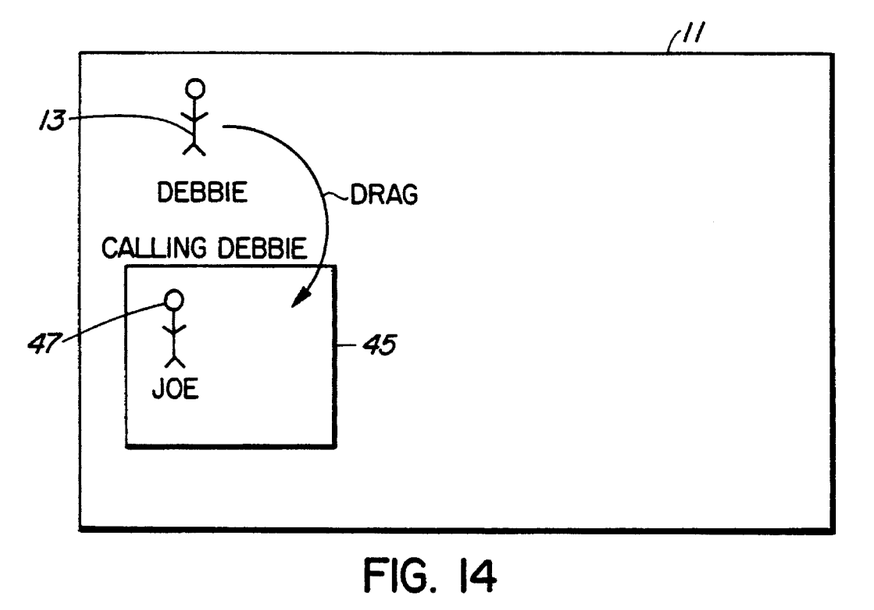

With reference now to FIG. 14, this illustrates the case in which Debbie's telephone is idle, and an incoming call is being received. The application software program places a Calling Debbie icon 45 on the display 11, with the name of the calling party (Joe) and his icon 47. In case the call was a call transfer from another dialed number, the icon 45 would state the name of the party being called, as supplied from a central office, PABX, rather than Debbie (e.g. calling Bob). A signal indicating the name of the calling party (Joe) is provided to the application software program, which looks up his name from the aforenoted directory, or otherwise obtains it from the central office or PABX. Preferably the application software program causes ringing or some other alerting sound to be emitted from a loudspeaker of the personal computer 1.

Figure 15:
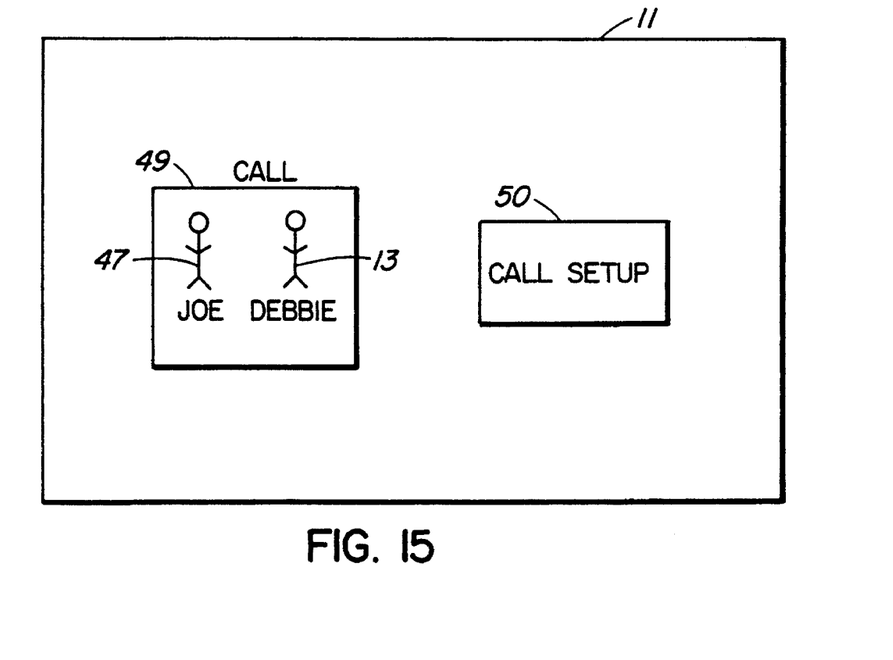

To answer the call, Debbie drags her icon 13 to the calling Debbie icon 45 or picks up the handset, as shown in FIG. 14. The application software program establishes a call connection between the two lines, changes the calling Debbie icon 45 to a call icon 49, and establishes a call setup icon 50, as shown in FIG. 15.

Figure 16:
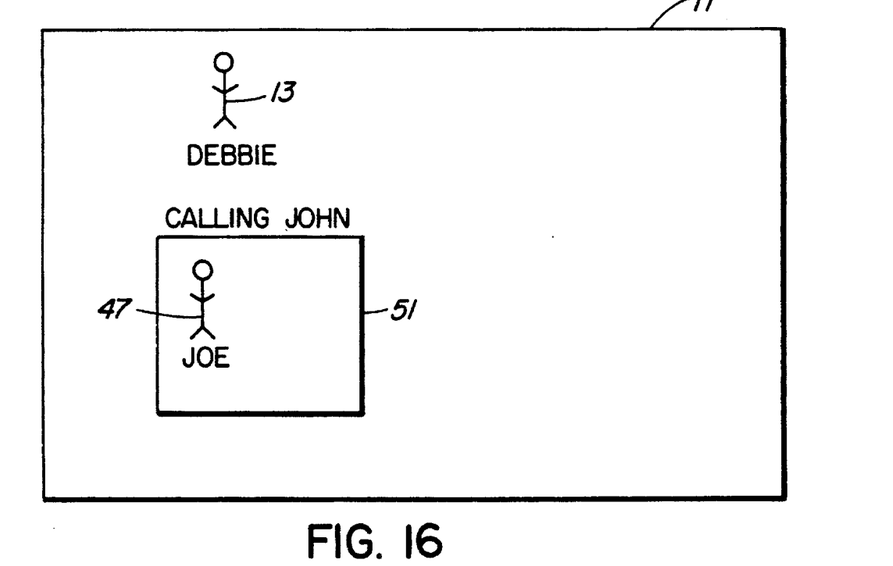

FIG. 16 illustrates a calling icon appearing on Debbie's line, in this case a calling John icon 51. In this case Debbie's line has an appearance of John's number. The calling icon can have a delayed interval before it is presented on the display, to allow John to answer his telephone at some other appearance before it appears for Debbie (or John if he is visiting Debbie) to answer the call by dragging Debbie's icon 13 to the calling John icon 51.

It should be noted that the calling Debbie icon need not be the rectangular icon illustrated in FIG. 14, but can be any fanciful representation, such as the depiction of a person knocking at a door, pointing to a ringing telephone, etc. Indeed any of the icons indicated in this specification can be represented in other ways than the particular ones shown.

The above has described certain of the basic calling features of a modern telephone system, wherein all ambiguity of the status of and who are the parties to various calls that can can be controlled and/or answered by the user Debbie is substantially eliminated. Using similar principles, a person skilled in the art will now be able to provide unambiguous other features, such as call pickup, redial, speed call, callback, etc.

A person understanding this invention may now conceive of alternative structures and embodiments or variations of the above. All of those which fall within the scope of the claims appended hereto are considered to be part of the present invention.

We claim:

1. A method of providing a visual indication to a first communication connection (CC) subscriber of the status of a telephone CC, comprising the steps of:
   (a) providing an icon on a display that represents the first CC subscriber,
   (b) providing a call setup icon on a display representing a command to set up a CC,
   (c) dragging the icon representing the first CC subscriber to the call setup icon,
   (d) automatically displaying a directory of subscribers,
   (e) dragging an identity of a second CC subscriber from the directory to the call setup icon,
   (f) establishing a CC between communication apparatus used by the first subscriber and communication apparatus used by the second CC subscriber via subscriber's lines,
   (g) changing the identity of the calls setup icon to a call icon,
   (h) displaying an icon representing the second CC subscriber in the call icon, and
   (i) displaying a new call setup icon,
   whereby icons representing CC subscribers of a call in progress are both represented and are visually discernible by the first CC subscriber in the call icon.

2. A method as defined in claim 1 including displaying a terminate icon on the display, dragging at least one of the icons of the CC subscribers of a call in progress to the terminate icon, dropping the call in progress and providing said icon on the display that represents the first CC subscriber in preparation for the establishing of another call.

3. A method as defined in claim 1 in which the CC is a telephone link.

4. A method as defined in claim 1 in which the CC is a video and telephone link.

5. A method as defined in claim 1, including displaying an icon representing a file on a display, dragging the file to the icon representing the second CC subscriber and transmitting the file to the second CC subscriber.

6. A method as defined in claim 5 including displaying the content of the file on the display of the first CC subscriber.

7. A method as defined in claim 5 in which the file represents a facsimile file.

8. A method as defined in claim 1 in which the call icon includes a peripheral displayed line surrounding the icons representing the CC subscribers of the call in progress.

9. A method as defined in claim 8 including:
   (i) displaying an I.C. icon representing the identity of a calling party of an iconing call on the display,
   (ii) dragging the icon representing the first CC subscriber to the I.C. icon,
   (iii) establishing a second call icon surrounding the icons; of the first and calling parties,
   (iv) placing the CC line used by the second CC subscriber on hold,
   (v) changing the icon representing the first subscriber to a ghost icon in the first call icon,
   (vi) establishing a CC between the communication apparatus used by the first subscriber and communication apparatus used by the calling party,
   whereby icons representing CC subscribers of a second call in progress are both represented in the second call icon, and the icon representing the second CC subscriber with a ghost icon of the first CC subscriber denoting the second CC subscriber being on hold are both visually represented in the first call icon.

10. A method as defined in claim 9 including flashing or changing color the icon representing the calling party prior to step (ii), and terminating the flashing or changing color once the CC between the communication apparatus used by the first subscriber and communication apparatus used by the calling party.

11. A method as defined in claim 8 including dragging the icon representing first CC subscriber to the new call setup icon, placing the second CC subscriber's line on hold, displaying an image of the icon representing the first CC subscriber in the call icon, displaying a directory of subscribers, dragging an identity of a third CC subscriber from the directory of subscribers, establishing a CC between communication apparatus used by the first subscriber and communication apparatus used by the third CC subscriber, changing the identity of the new call setup icon to a second call icon, displaying an icon representing the third CC subscriber in the second call icon and displaying another new call setup icon, whereby icons representing CC subscribers of a second call in progress are both represented in the second call icon, and the icon representing the second CC subscriber with a ghost icon of the first CC subscriber denoting the second CC subscriber being on hold are both visually represented in the first call icon.

12. A method as defined in claim 11 including dragging the icon representing the second CC subscriber within the second call, icon, conferencing the second CC subscriber with the first and third subscribers in a conference call, changing the identity of the second call icon to a conference icon and extinguishing the first call icon and ghost icon of the first subscriber.

13. A method as defined in claim 12 including displaying an icon representing a file on a display, dragging the file icon to the conference icon but separated from the CC subscriber icons and transmitting the file to all of said second and third subscribers.

14. A method as defined in claim 12 including displaying an icon representing a file on a display, dragging the file icon to an icon representing either the second or third CC subscribers and transmitting the file only to said second or third subscriber.

15. A method as defined in claim 14, in which the file represents a facsimile file.

16. A method as defined in claim 12 including a hold icon on the display, dragging as of the icons in the call icon to the hold icon and placing a line corresponding to the icon in the hold icon on hold and usable to participate in the conference.

17. A method as defined in claim 16 including displaying a terminate icon on the display, dragging at least one of the icons of the CC subscribers of a call in progress to the terminate icon, dropping the subscriber's line from the conference and maintaining the call in progress.

18. A method as defined in claim 17 including changing the conference call icon to a call icon in the event a CC remains between only the first and one other subscriber.

19. A method of providing a visual indication of the status of a communication connection, comprising the steps of displaying parties to a call in progress as icons contained within the periphery of another icon representing a call in progress, displaying an icon representing a party on hold in another icon representing a call in progress, and displaying an icon representing the party that has placed the party on hold as a ghost icon.

\* \* \* \* \*